(12) United States Patent
Vera et al.

(10) Patent No.: US 12,128,330 B2
(45) Date of Patent: Oct. 29, 2024

(54) PROCESS AND SYSTEM FOR CONTAMINANTS REMOVAL

(71) Applicant: Cameron International Corporation, Houston, TX (US)

(72) Inventors: Francisco E. Vera, Cypress, TX (US); Gary W. Sams, Spring, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 154 days.

(21) Appl. No.: 17/934,019

(22) Filed: Sep. 21, 2022

(65) Prior Publication Data

US 2023/0088299 A1    Mar. 23, 2023

Related U.S. Application Data

(60) Provisional application No. 63/246,558, filed on Sep. 21, 2021.

(51) Int. Cl.
| | |
|---|---|
| *B01D 17/06* | (2006.01) |
| *B01D 11/04* | (2006.01) |
| *B01D 17/02* | (2006.01) |
| *C10G 53/04* | (2006.01) |
| *C11B 3/00* | (2006.01) |

(52) U.S. Cl.
CPC .......... *B01D 17/06* (2013.01); *B01D 11/0419* (2013.01); *B01D 11/0488* (2013.01); *B01D 17/02* (2013.01); *C10G 53/04* (2013.01); *C11B 3/001* (2013.01); *C11B 3/005* (2013.01); *C11B 3/006* (2013.01); *C10G 2300/1011* (2013.01)

(58) Field of Classification Search
CPC ..... B01D 17/045; B01D 17/047; B01D 17/06
See application file for complete search history.

(56) References Cited

U.S. PATENT DOCUMENTS

| | | | |
|---|---|---|---|
| 3,839,176 A | * | 10/1974 | McCoy ................. B03C 11/00 204/570 |
| 9,499,767 B2 | | 11/2016 | Stigsson et al. |
| 2003/0050492 A1 | | 3/2003 | Copeland et al. |
| 2009/0242384 A1 | | 10/2009 | Curcio et al. |
| 2013/0158279 A1 | | 6/2013 | Mezza et al. |
| 2017/0009181 A1 | | 1/2017 | Kotoneva |
| 2017/0175008 A1 | * | 6/2017 | Sprenkel ............ B01D 19/0036 |
| 2020/0056107 A1 | | 2/2020 | Iversen et al. |

FOREIGN PATENT DOCUMENTS

EP    2935545 B1    8/2020

* cited by examiner

*Primary Examiner* — Brian W Cohen
(74) *Attorney, Agent, or Firm* — Jeffrey D. Frantz

(57) ABSTRACT

Embodiments described herein provide a method, comprising routing a bio-oil to a mixing device; routing a wash material to the mixing device; using the mixing device to form a mixture from the bio-oil and the wash material; routing the mixture to an electrostatic separator; and applying an electric field to the mixture, in the electrostatic separator, to separate the wash material from the bio-oil.

7 Claims, 2 Drawing Sheets

PROCESS AND SYSTEM FOR CONTAMINANTS REMOVAL

CROSS-REFERENCE TO RELATED APPLICATIONS

This patent application claims benefit of U.S. Provisional Patent Application Ser. No. 63/246,558 filed Sep. 21, 2021, which is entirely incorporated herein by reference.

BACKGROUND

The present disclosure generally relates to methods and systems for removing contaminants. More particularly, the present disclosure relates to methods and systems for removing contaminants from bio-oil.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Industries using bio-diesel materials are producing large quantities of oil-diesel by-product. For example, Crude Tall Oil ("CTO") refers to a by-product stream obtained during pulping of wood in the Kraft pulping process. CTO or similar oil-diesel by-products represent an attractive pool of renewable fine chemicals.

Distillation is a known process to treat bio-diesel oil by-products, such as CTO or vegetable oil (such as corn oil), to retrieve their valuable chemical fraction such as an acidic fraction, as described in U.S. Pat. No. 9,499,767. It is however important to minimize the impurities contained in these oils in order to maximize the efficiency of the refinement process.

It thus would be beneficial to remove impurities and solids from bio-diesel oils to further enhance their quality and value for further processing.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method, comprising routing a bio-oil to a mixing device; routing a wash material to the mixing device; using the mixing device to form a mixture from the bio-oil and the wash material; routing the mixture to an electrostatic separator; and applying an electric field to the mixture, in the electrostatic separator, to separate the wash material from the bio-oil.

Other embodiments described herein provide a method, comprising routing a bio-oil to a mixing unit; selecting a wash composition, based on a contaminant in the bio-oil; routing the wash composition from a wash material unit to the mixing unit; using the mixing unit to form a mixture from the bio-oil and the wash composition; routing the mixture to a separation unit comprising at least two electrostatic separators; and recovering a clean bio-oil from the separation unit.

Other embodiments described herein provide a system, comprising a bio-oil source; a mixing unit comprising one or more mixing devices; a bio-oil conduit to provide bio-oil from the bio-oil source to the mixing unit; a wash materials unit comprising one or more wash material sources; a wash composition conduit to provide the one or more wash materials, in an aqueous wash composition, to the mixing unit; and a separation unit comprising one or more electrostatic separators configured to apply an electric field to a mixture obtained from the mixing unit and to adjust operating conditions to optimize separation of the mixture into an oil phase and an aqueous phase, wherein the mixing unit comprises two or more selectable mixing devices, the separation unit comprises two or more selectable electrostatic separators, or both.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In embodiments of the disclosure, it is proposed a process for treatment of oil made from biological materials (herein referred to as "bio-oil") for removal or extraction of contaminants. Most bio-oil is made from animal fats or vegetable oils, renewable resources that come from plants such as soybean, sunflowers, corn, olive, peanut, palm, coconut, safflower, canola, sesame, cottonseed, poplar, pine, and other plant sources.

Figure 1:
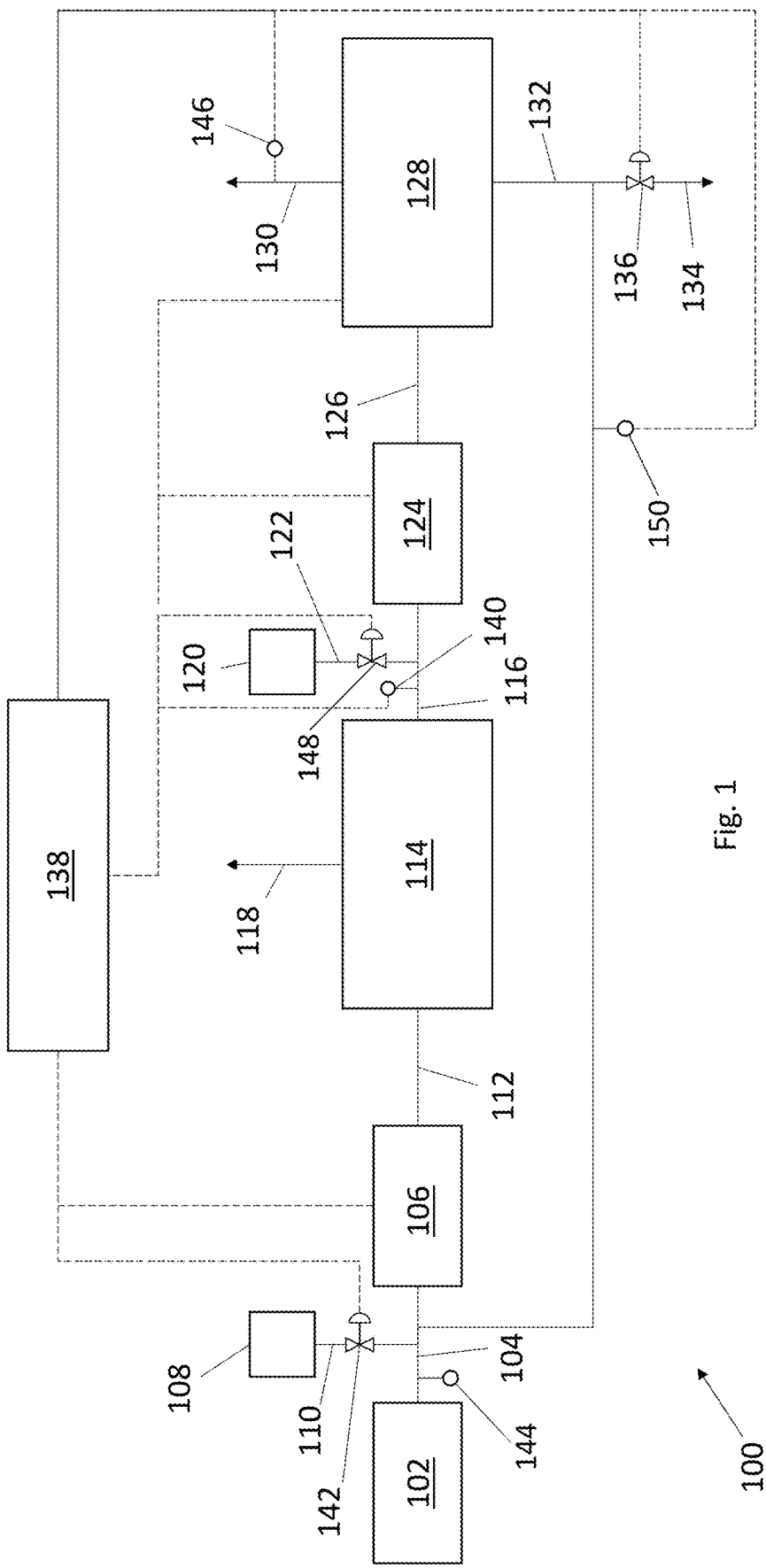
FIGS. 1 and 2 illustrate a representative figure of a system in accordance with embodiments of the present disclosure.

Impurities and contaminants can be removed from such materials using a process comprising multiple steps wherein wash water or wash solutions might be injected to a main bio-diesel oil stream. Mixing devices (for example static devices such as mixing valves and/or static mixers or dynamic devices such as agitated tank mixers or in-line motorized mixers) can be used to create intimate, high surface area contact between the bio-oil and the wash material to facilitate rapid movement of contaminants from the oil phase to the aqueous phase. Such mixture can then be routed to an electrostatic coalescer to expeditiously separate the oil phase from the aqueous phase. In some cases, two or more impurity removal stages can be performed using wash water, or wash solutions that can target certain undesired materials depending on the nature of crude bio-oil. FIG. 1 is a process diagram of a CTO wash process 100 according to one embodiment. A CTO source 102, or other bio-oil source, provides a bio-oil stream 104 to a mixing device 106. A wash source 108 provides a wash stream 110 to the mixing device 106. The mixing device 106 mixes the bio-oil stream 104 and the wash stream 110 intimately to provide high surface area of contact between the bio-oil stream and the wash stream in a mixture. The mixture is typically droplets of wash material dispersed in a continuous oil phase (which is mainly bio-oil), with the droplets having sizes that range from about x mm to about y mm. The degree of mixing, and therefore the droplet size targeted by the mixing device 106, depends on the quantity and type of contaminants in the bio-oil stream 104, characteristics of the bio-oil stream 104 such as viscosity, density, and polarity, and quantity and type of wash material used for the wash stream 110. The mixing device 106 may be one or more static or dynamic mixers such as flow restriction mixers, baffle mixers, agitated mixers, which can be tank or in-line agitated mixers, pump mixers, jet mixers, and the like.

The wash stream 110 is aqueous and may be only water or water with additives and/or processing aids. For example, the wash stream 110 may include surfactants, emulsifiers, pH adjustment reagents such as acids, bases, and/or buffers, flocculants, precipitation agents, chelating agents, polymerizing agents, and the like to aid in removing unwanted materials and/or facilitate separating the bio-oil material from the wash material.

The mixing device 106 produces a mixture 112 that is routed to an electrostatic separator 114. The electrostatic separator 114 comprises a vessel for receiving the mixture 112. The vessel is equipped with one or more electrodes electrically connected to one or more power sources to create an electric field throughout the bio-oil contained within the vessel. The electrostatic separator 114 may be any of several types of electrostatic separator, depending on characteristics of the materials to be processed. The types of electrostatic separator include DC, pulsed DC, AC, variable frequency AC, dual-frequency AC, multi-frequency AC, and flexible waveform separators. Each of the types of electrostatic separators that can be used have processing parameters that can be tuned to improve separation of the wash material from the bio-oil based on the characteristics of both materials. Voltage, which may be DC voltage or RMS voltage, or both, can be adjusted for each type of separator. Pulse characteristics, such as pulse length and duty cycle, can be adjusted for a pulsed DC separator. Frequency can be adjusted for a variable frequency AC separator. Two AC frequencies, two AC amplitudes, and two duty cycles of two AC sources can be adjusted for a dual-frequency AC separator. Frequencies, amplitudes, and duty-cycles of all AC sources can be adjusted for multi-frequency AC separators, and virtually any waveform characteristic can be selected and adjusted, including amplitude, frequency, and overall waveform shape, along with duty cycle, can be adjusted for a flexible waveform separator. In some cases, a separator can be provided with different electric field zones powered using different patterns (or no pattern for static DC). For example, a separator may have multiple electrodes arranged within a vessel and connected to power sources to provide electric field zones with different properties at different locations within the vessel to subject bio-oils to spatially different electric field conditions within the vessel. For example, a first zone within the vessel may have a single-frequency-varying electric field while a second zone within the vessel has a dual- or multi-frequency-varying electric field. The first and second zones may be adjacent or spaced apart in any direction within the vessel and may have dimensions less than or equal to an internal dimension of the vessel. All these different kinds of separators can be used to provide operating flexibility for a bio-oil wash facility to process bio-oils having diverse and potentially unpredictable properties.

The materials in the mixture 112 may have non-traditional characteristics. Whereas materials traditionally processed using electrostatic separators, such as mixtures of crude oil and water, have known behaviors when subjected to electrostatic separation processes, bio-oils are diverse materials from diverse sources having diverse properties, so the precise behavior of the bio-oil in the electrostatic separator 114 may be unknown before the material is processed. While viscosity and density of materials, and electrical properties of materials, affect the behavior of crude oil-water mixtures subjected to electrostatic separation, and crude oils have well-known temperature-viscosity-density relationships, bio-oils may have non-traditional temperature-viscosity-density relationships. Bio-oils will also have different solubility/miscibility profiles with water, different electrical profiles (conductivity, dielectric coefficient, electroviscosity, etc.), different dispersion characteristics in water (e.g. dispersion volume) and different composition of salts and impurities. The electrostatic separator 114 can therefore be equipped with temperature and pressure adjustment to find an operating window for a particular combination of bio-oil and wash material.

The electrostatic separator 114, which may be a coalescer, separates the mixture 112 into at least an oil phase and an aqueous phase, producing at least a purified bio-oil stream 116 and a contaminant stream 118. Where the bio-oil stream contains gas, the electrostatic separator 114 may also produce a gas phase and a gas stream, not shown in FIG. 1. The contaminant stream 118 is routed to any suitable use. The purified bio-oil stream 116 may be ready for use by another process after purification in the process 100.

The purified bio-oil stream 116 may, however, be subjected to a second cleaning in the process 100. The mixing device 106 may be a first mixing device, the wash source 108 may be a first wash source, the wash stream 110 may be a first wash stream, the mixture 112 may be a first mixture, and the electrostatic separator 114 may be a first electrostatic separator. An optional second wash source 120 may provide a second wash stream 122 to an optional second mixing device 124. The purified bio-oil stream 116 may also be provided to the second mixing device 124. The second mixing device 124 may be the same kind of mixing device as the first mixing device 106 or a different kind of mixing device. For example, where contaminant load in the purified bio-oil stream 116 is low, but further contaminants are to be removed, very small droplet size and very high interfacial surface area may be needed to extract the contaminant at a reasonable rate, so the second mixing device may provide higher shear than the first mixing device. If the contaminant load in the bio-oil stream 104 is relatively high, using a static mixer as the first mixing device may provide enough contact surface area for the first wash. Then, a dynamic mixer can be used as the second mixing device to provide high dispersion, small droplet size, and high contact surface area to complete the contaminant reduction process. The second mixing device 124 provides a second mixture 126 to a second electrostatic separator 128, which may be a coalescer, and which separates the second mixture 126 into at least an oil phase and an aqueous phase, from which a clean bio-oil stream 130 and a second contaminant stream 132 are respectively obtained. A second cleaning may be useful where contaminant load in the bio-oil stream 104 is particularly high and a single cleaning is unlikely to remove enough contaminant. A second cleaning may also be useful where two contaminants are more effectively removed using two different compositions of wash streams, so the first wash stream can have a first composition selected to remove a first contaminant in a first wash and a second stream can have a second composition selected to remove a second contaminant in a second wash, with an electrostatic separation between the first and second washes, where the first composition is different from the second composition. A second cleaning may also be useful where the second cleaning is more effective after entrained water is removed in the first cleaning. In such cases, the first cleaning may use an electrostatic separator configured to dehydrate the oil phase.

In one case, a first treatment may utilize an acid material to complete conversion of precursors into bio-oil materials. The acid material can be included in a wash stream 110 provided to the mixing device 106. The mixture 112, in such cases, include an aqueous phase that may be acidic and an oil phase comprising a bio-oil material, which may have impurities not removed by contacting with the wash stream 110. The electrostatic separator 114 will be operated to optimize separation of the two phases even where the ion content of the aqueous phase and the amount and types of various impurities of the oil phase varies. In this case, the second wash stream 122 can be configured to remove remaining impurities in the purified bio-oil 116 using reagents selected to remove the remaining impurities. The second wash stream 122 may also include a base to neutralize any remaining trace amounts of acid that may be left in the purified bio-oil 116 after the first treatment.

Where a second electrostatic separator like the separator 128 is used, optionally, the second contaminant stream 132 may be routed to the first mixing device 106 to conserve wash material. The second contaminant stream 132 may be clean enough to be used as a wash material in the first mixing device 106. To control inventory of wash material and contaminant load in the process 100, where the second contaminant stream 132 is routed to the first mixing device 106, a purge stream 134 may be withdrawn from the contaminant stream 132, or directly from the aqueous phase of the second electrostatic separator 128. Here, the purge stream 134 is shown being withdrawn from the second contaminant stream 132. A flow controller 136 may be used to control a rate at which the purge stream 134 is withdrawn from the process 100. The flow controller 136 may be operatively coupled to a level sensor of the second electrostatic separator 128 and used to control fluid level in the second electrostatic separator 128.

A separate controller 138 may be used to receive signals from the second electrostatic separator 128 that represent operating configuration of the second electrostatic separator 128, such as fluid level in the vessel, and may be operatively coupled to the second electrostatic separator 128 and to the flow controller 136 to control operation of the flow controller 136 based on the signals received from the second electrostatic separator 128.

In general, the controller 138 can be used in many ways to control operation of the process 100. Sensors can be used to sense properties of streams of the process 100, along with operating parameters of the equipment of the process 100. A composition sensor 140 can be coupled to the purified oil stream 116 and operatively coupled to the controller 138 to send signals to the controller representing composition of the purified oil stream 116. The controller 138 can interpret the signals from the sensor 140 to monitor performance of the electrostatic separator 114, and can adjust operating parameters, such as temperature, pressure, flow rate of wash material, total flow rate of the mixture 112 to the separator 114, and properties of the electric field formed by the separator 114, to adjust the composition detected by the sensor 140. The controller 138 can be operatively coupled to a flow controller 142 disposed to control flow of the wash stream 110, and can thus control flow rate of the wash stream 110 based on signals from the sensor 140. The controller 138 can also be operatively coupled to the mixing device 106, where the mixing device 106 has controllable parameters, to control operation of the mixing device 106. Control of the mixing device 106 may also be based on signals from the sensor 140.

A control model may be used by the controller 138 to determine which operating parameters of the process 100 to manipulate. The control model may be configured as a machine learning application to output signals to all controllable equipment of the process 100 based on signals from the sensor 140 along with other sensors, such as temperature and pressure sensors, not shown in FIG. 1. A feed composition sensor 144 can also be coupled to the bio-oil stream 104 and operatively coupled to the controller 138 to provide predictive control based on a control model of the controller 138.

Where the second mixing device 124 and second electrostatic separator 128 are used, a composition sensor 146 may be coupled to the clean oil stream 130 and operatively coupled to the controller 138 to provide signals representing performance of the overall process 100, including the two electrostatic separators and two mixing devices. The controller 138 can be operatively coupled to the second electrostatic separator 128 and the second mixing device 124 to adjust operating parameters thereof based on signals from the sensor 146. The controller 138 can also be operatively coupled to a second wash flow controller 148 to control flow rate of the second wash stream 122 based on signals from the sensor 146, the sensor 140, the sensor 144, or any combination thereof.

A contaminant stream composition sensor 150 can be coupled to the contaminant stream 132 and operatively coupled to the controller 138 to provide signals representing composition of the contaminant stream 132 to the controller 138.

Figure 2:
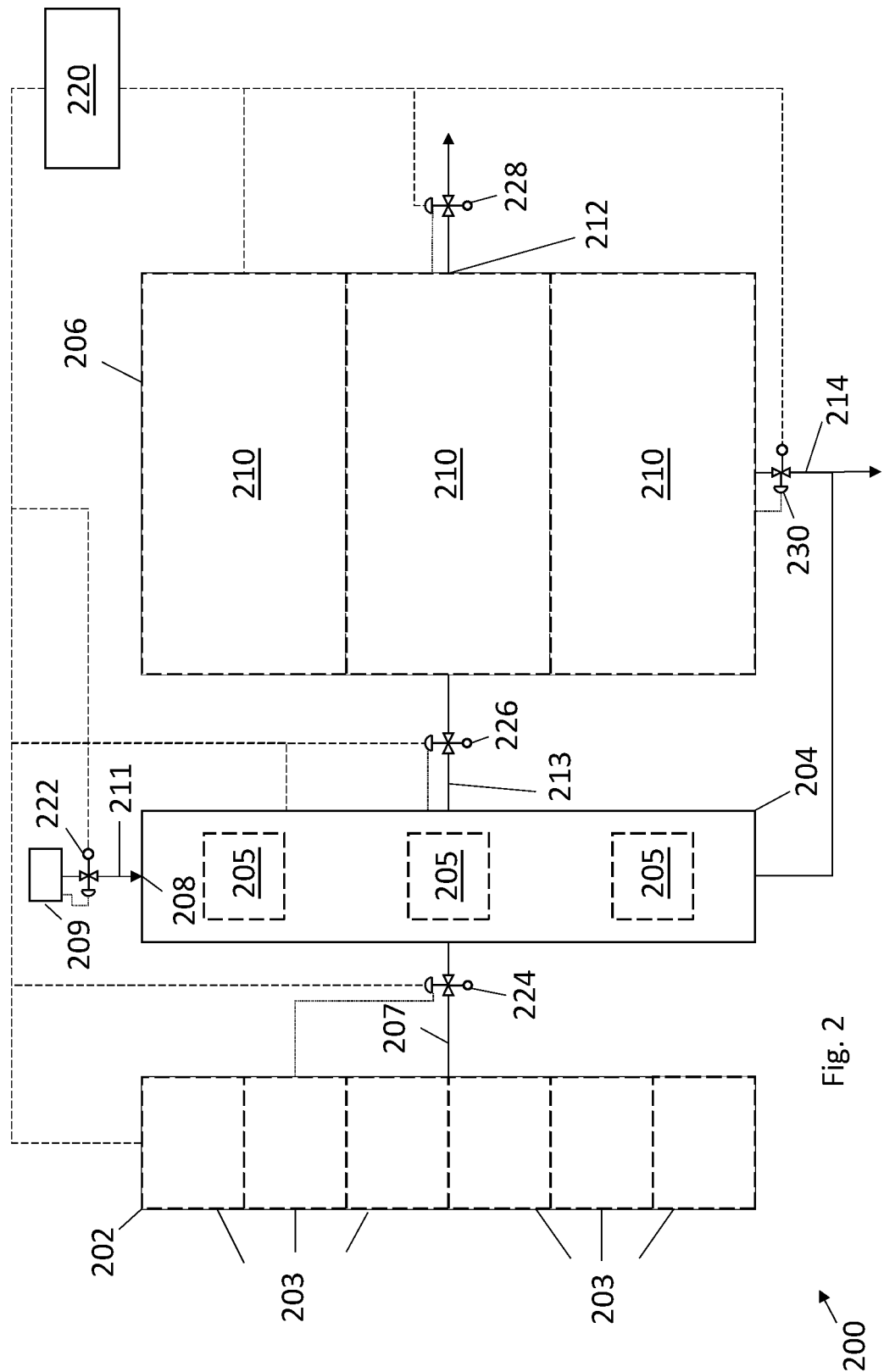

FIG. 2 is a schematic process diagram of a bio-oil purification process 200, according to one embodiment. The process 200 comprises a wash materials unit 202, a mixing unit 204, and a separation unit 206. The wash material unit 202 comprises a plurality of wash materials 203 that can be selected for use in purifying a bio-oil based on composition of the bio-oil. A bio-oil is provided to the mixing unit 204 at an inlet 208 of the mixing unit 204. A bio-oil source 209 provides the bio-oil using a bio-oil conduit 211 coupled to the inlet 208. The bio-oil conduit 211 may be a pipe, or the bio-oil conduit 211 may be a manifold for routing bio-oil from the bio-oil source 209 to any mixing device 205 of the mixing unit 204. A wash composition is provided from the wash materials unit 202 to the mixing unit 204 along a wash composition conduit 207, which may be a pipe or manifold for routing the wash composition from the wash materials unit 202 to any mixing device 205 of the mixing unit 204. The wash composition is selected based on a contaminant to be removed from the bio-oil. The wash composition is an aqueous composition that may contain a wash material along with a processing aid, such as an emulsifier, de-emulsifier, surfactant, or other processing aid.

The mixing unit 204 is configured to mix the bio-oil and the wash composition to achieve fluid properties, such as droplet size or contact surface area, based on properties of the bio-oil and/or the contaminant or contaminants to be removed from the bio-oil. The mixing unit 204 may comprise a plurality of mixing devices 205, which may include low-shear and high-shear devices, that can be selected and used based on the fluid properties desired in the mixture. The mixture is provided to the separation unit 206 using a mixture conduit 213 that may be a pipe or manifold.

The separation unit 206 has at least two electrostatic separators 210 that can be selected to provide optimal separation operation. The mixture conduit 213 can be a manifold for routing the mixture from the mixing unit 204 to any electrostatic separator 210 of the separation unit 206. The electrostatic separators may be of different types, or all of the same type depending on the anticipated service of the process 200. For example, in the embodiment of FIG. 2, where three electrostatic separators 210 are included in the separation unit 206, one separator can be an AC/DC electrostatic separator, one can be a multi-frequency (e.g. dual-frequency) AC electrostatic separator, and a third can be a pulsed DC electrostatic separator so that the type of separator can be selected based on properties of the bio-oil and wash composition used to make the mixture. Manifolding and valving can be provided to allow selecting combinations of wash materials, mixing devices, and separators.

The separation unit 206 yields a clean bio-oil at an outlet 212 of the separation unit 206. The separation unit 206 also yields one or more contaminant streams 214. One contaminant stream 214 is shown in FIG. 2 for simplicity, but each separator 210 separates a mixture into at least an oil phase and an aqueous phase, from which a bio-oil and a contaminant stream are respectively obtained. The separators 210 of the separation unit 206 may be operated in parallel or series formation, so where the separators are operated in parallel formation, the bio-oil products can be combined and the contaminant streams can be combined. The contaminant streams can be recycled among the separators 210, where the composition of the contaminant streams is suitable. The contaminant streams can also be routed to the mixing unit 204, where the composition of the contaminant streams is suitable. Recycling contaminant streams can optimize and conserve use of water in the process 200.

A controller 220 can be used to control all aspects of the process 200. Where multiple selectable mixing devices 205 are included in the mixing unit 204, the controller 220 can control flow control devices to select one or more of the mixing devices 205 dynamically based on fluid properties. Likewise, where multiple selectable electrostatic separators 210 are included in the separation unit 206, the controller can control flow control devices to select one or more of the electrostatic separators 210 based on fluid and/or environmental properties. Flow control-sensor installations can be coupled to various locations in the process 200 and operatively coupled to the controller 220 to provide signals to the controller 220 representing parameters and characteristics of the process 200 and to receive control signals from the controller 220 to adjust flows. A first flow control-sensor installation 222 can be coupled to the bio-oil conduit 211 to detect any combination of composition, temperature, and flow rate of bio-oil in the bio-oil conduit 211, to provide signals representing any detected composition, temperature, and flow rate of the bio-oil to the controller 220, and to receive flow control signals from the controller 220 to control flow rate of the bio-oil to the mixing unit 204. Where the mixing unit 204 contains multiple selectable mixing devices, the flow control-sensor installation 222 can be configured to control flow to the multiple mixing devices based on selection control signals received from the controller 220.

The bio-oil source 209 may include a plurality of bio-oil materials and a blending or manifold to provide a blend of bio-oil materials through the bio-oil conduit 211. In such cases, the first flow control-sensor installation 222 can include flow control to control flow rates of the individual bio-oil materials through the bio-oil conduit 211 and sensors to detect any combination of composition, temperature, and flow rate of the individual bio-oil materials of the bio-oil source 209. In such cases, the controller 220 can also be configured to receive signals from the first flow control-sensor installation 222 representing any combination of detected flow rate, temperature, and composition of the individual bio-oil materials of the bio-oil source 209 and to send flow control signals to control the flow rates of the individual bio-oil materials into the bio-oil conduit 211.

A second flow control-sensor installation 224 can be coupled to the wash materials conduit 207 to detect any combination of composition, temperature, and flow rate of the wash composition in the wash materials conduit 207, to provide signals representing any detected composition, temperature, and flow rate of the wash composition to the controller 220, and to receive flow control signals from the controller 220 to control flow rate of the wash composition to the mixing unit 204. Where the mixing unit 204 contains multiple selectable mixing devices, the second flow control-sensor installation 224 can be configured to control flow to the multiple mixing devices based on selection control signals received from the controller 220.

Where the wash materials unit 202 has multiple selectable wash materials 203, the second flow control-sensor installation 224 can include flow control to control flow rates of the individual wash materials 203 through the wash materials conduit 207 and sensors to detect any combination of composition, temperature, and flow rate of the individual wash materials of the wash materials unit 202. In such cases, the controller 220 can also be configured to receive signals from the second flow control-sensor installation 224 representing any combination of detected flow rate, temperature, and composition of the individual wash materials and to send flow control signals to control the flow rates of the individual wash materials into the wash materials conduit 207.

A third flow control-sensor installation 226 can be coupled to the mixture conduit 213 to detect any combination of composition, temperature, and flow rate of the mixture in the mixture conduit 213, to provide signals representing any detected composition, temperature, and flow rate of the mixture to the controller 220, and to receive flow control signals from the controller 220 to control flow rate of the mixture to the separation unit 206. Where the separation unit 206 contains multiple selectable electrostatic separators 210, the third flow control-sensor installation 226 can be configured to control flow to the multiple electrostatic separators 210 based on selection control signals received from the controller 220. Where the mixing unit 204 has multiple selectable mixing devices 205, the third flow control-sensor installation 226 can also include flow control to obtain flow from selected mixing devices.

A fourth flow control-sensor installation 228 can be coupled to the clean bio-oil effluent that emerges from the outlet 212 of the separation unit 206 to detect any combination of composition, temperature, and flow rate of the clean bio-oil exiting the separation unit 206, to provide signals representing any detected composition, temperature, and flow rate of the clean bio-oil to the controller 220, and to receive flow control signals from the controller 220 to control flow rate of the clean bio-oil. Where the separation unit 206 has multiple selectable electrostatic separators 210, the fourth flow control-sensor installation 228 can have flow control for bio-oil streams obtained from the individual electrostatic separators 210.

A fifth flow control-sensor installation 230 can be coupled to the contaminant stream 214 of the separation unit 206 to detect any combination of composition, temperature, and flow rate of the contaminant stream 214 exiting the separation unit 206, to provide signals representing any detected composition, temperature, and flow rate of the contaminant stream to the controller 220, and to receive flow control signals from the controller 220 to control flow rate of the contaminant stream 214. Where the separation unit 206 has multiple selectable electrostatic separators 210, the fourth flow control-sensor installation 228 can have flow control for contaminant streams obtained from the individual electrostatic separators 210.

The controller 220 can also be configured to adjust operating parameters of the mixing unit 204 and the separation unit 206 based on any signals from any sensors in the process 200 described above. The controller 220 can be configured to send control signals to the mixing unit 204 to select mixing devices 205 and to control operating parameters of any dynamic mixing devices such as agitation speed, pumparound speed, and any dynamically controllable agitator and/or pump configuration such as blade length or pitch. The controller can also be configured to send control signals to the separation unit 206 to select electrostatic separators 210 and to control operating parameters of any of the electrostatic separators such as temperature, pressure, and electric field parameters. The controller 220 can be configured to determine any control signals to the mixing unit 204 and/or the separation unit 206 based on composition of the mixture in feedback mode, composition of the clean bio-oil in feedback mode, composition of the contaminant stream in feedback mode, composition of any bio-oil of the bio-oil source 209 in feed-forward mode, and/or composition of any wash material of the wash materials unit 202 in feed-forward mode. The controller 220 can be configured with "machine learning" and/or "artificial intelligence" routine to perform advanced statistical analyses and modelling to determine control signals to the mixing unit 204 and/or the separation unit 206.

As in FIG. 1, the contaminant stream 214, or any individual contaminant stream, of the separation unit 206 can be returned to the mixing unit 204 as an available wash material under suitable circumstances. Where the composition of a contaminant stream of the separation unit 206 is suitable for use as a wash material, the contaminant stream can be routed to the mixing unit 204, to any selected mixing device 205 with appropriate flow control. The fifth flow control-sensor installation 230 can be coupled to the recycle contaminant conduit. Alternately, individual flow control-sensor installations can be coupled to individual conduits for returning contaminant streams to the mixing unit 204, and the controller 220 can be configured to send control signals to control the flow rates of any contaminant stream being returned to the mixing unit 204 based on composition of the contaminant stream, the clean bio-oil, the mixture 213, the bio-oil in the conduit 211, and the wash material in the conduit 207. The controller 220 can also be configured to adjust any flow rate or operating parameter of the process 200 based on composition of the contaminant stream being returned to the mixing unit 204, if any. The controller 220 can thus be configured to make equipment selection and operating decisions based on performance of the process 200 in cleaning bio-oils of different compositions based on detecting those compositions to achieve a desired result in cleaning a bio-oil.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
routing a bio-oil to a first mixing device;
routing a first wash material to the first mixing device, the first wash material comprising an acid material;
using the first mixing device to form a first mixture from the bio-oil and the first wash material, wherein the first mixture comprises an acidic aqueous phase including the first wash material and oil phase including the bio-oil;
routing the first mixture to a first electrostatic separator;
applying an electric field to the first mixture, in the first electrostatic separator, to separate the first wash material from the bio-oil;
routing the bio-oil from the first electrostatic separator to a second mixing device;
routing a second wash material to the second mixing device, the second wash material comprising a base material;
using the second mixing device to form a second mixture from the bio-oil and the second wash material;

routing the second mixture to a second electrostatic separator; and applying an electric field to the second mixture, in the second electrostatic separator, to separate the second wash material from the bio-oil.

2. The method of claim 1, further comprising:

extracting a contaminant from the bio-oil into the first wash material.

3. The method of claim 1, wherein the bio-oil comprises crude tall oil or vegetable oil.

4. The method of claim 1, wherein the first wash material further comprises a processing aid.

5. The method of claim 1, wherein the second electrostatic separator produces a clean bio-oil and a contaminant stream, and further comprising routing the contaminant stream to the first mixing device.

6. The method of claim 5, further comprising purging a portion of the contaminant stream.

7. The method of claim 6, further comprising controlling a rate of purging based on a composition of the contaminant stream or a liquid level in the second electrostatic separator, or both.

\* \* \* \* \*